Feb. 9, 1954

M. T. SCHUMB 2,668,454

MOUNTING FOR SPROCKETS, PINIONS OR THE LIKE

Filed Oct. 22, 1952

Inventor
Martin T. Schumb
by Roberts Cushman & Grover
Att'ys.

/ Patented Feb. 9, 1954

2,668,454

UNITED STATES PATENT OFFICE 2,668,454

MOUNTING FOR SPROCKETS, PINIONS, OR THE LIKE

Martin T. Schumb, Milton, Mass., assignor to Boston Gear Works—Division The Murray Company of Texas, Inc., North Quincy, Mass., a corporation of Delaware Application October 22, 1952, Serial No. 316,143

7 Claims. (Cl. 74—432)

This invention pertains to the mounting on a shaft of a toothed element, for instance, a pinion or sprocket, in such a way as to permit its ready removal for replacement when desired, and wherein a split, tapered bushing, fixed to the shaft, is received in a tapered, axial bore in the toothed element. Since, in such an arrangement, the wall of the bushing must be of substantial radial thickness to insure the requisite strength, the axial bore in the toothed element must be of a diameter considerably larger than though the toothed element were to be mounted directly on the shaft. Thus, if the toothed element have a small number of teeth, that is to say about twenty or less, the material intervening between the roots of the teeth and the wall of the bore of the toothed element may be of a thickness approximating the minimum thickness permissible to withstand the stresses of use, so that weakening said wall, for example, by boring holes or forming deep keyways or slots therein cannot be permitted. It is with reference to such toothed elements, having a small number of teeth and which are to be mounted in use upon a split bushing that the present invention particularly relates.

It has heretofore been proposed to employ a tapered bushing for de-mountably securing a large gear or sprocket to a shaft and, in such a construction, to provide the bushing and sprocket or gear with bolt-receiving holes formed partly in the bushing and partly in the hub portion of the sprocket or gear. Such an arrangement is very useful when the sprocket or gear is of such a diameter as to have sufficient material between its axial bore and the roots of the teeth to permit formation of the bolt holes without unduly weakening the sprocket or gear; but for de-mountably securing a sprocket or gear having a small number of teeth and wherein the axial bore is of a diameter such that there is little material between the wall of the bore and the roots of the teeth, such a procedure is not permissible since the formation of bolt holes in the hub portion of the sprocket or gear would unduly weaken it.

It has also been proposed to attach a wheel to a shaft by the use of a tapered bushing having a radial flange, with provision for bolting it to the hub of the wheel and this might perhaps be an effective way of de-mountably attaching a sprocket or gear of large diameter to its shaft, that is to say a sprocket or gear wherein the root diameter of its teeth is sufficiently large to provide an adequate thickness of material between the roots of the teeth and the wall of the axial bore to receive bolts for attaching the hub portion of the sprocket or gear to the bushing flange, but this method again would not be applicable to a sprocket or pinion having few teeth. The present invention contemplates the use of a flanged split bushing, such as just above referred to, which is designed to be connected by bolts to a complementary flange integral with but axially spaced from the sprocket or pinion. The employment of such a sprocket or pinion with an integral attaching flange has not heretofore been regarded as practical because, in order to provide room for the bolts and to insure proper strength of the parts, the diameters of the complemental flanges will usually exceed the root diameter of the teeth of the sprocket or pinion and, since the attaching flange, integral with the sprocket or pinion, is spaced from the sprocket or pinion but a short distance to conserve space, for example in a sprocket merely enough to provide clearance for a sprocket chain, it is impossible to form the teeth of the sprocket or pinion by the use of rotary cutters, which is the customary way of cutting spur teeth in pinions or sprockets. This difficulty doubtless accounts for the fact that as respects pinions or sprockets of small diameter (that is to say having but few teeth) the use of complemental radial flanges as a mode of securing the pinion or sprocket to a split bushing has not heretofore been employed.

The principal object of the present invention is to provide a mounting of the above type, applicable to sprockets or pinions having but few teeth, and wherein the axial bore of the sprocket or pinion is of the order of one-half or more the root diameter of the teeth, such that the sprocket or pinion may be effectively but de-mountably attached to a shaft without necessitating the provision of bolt-receiving holes, recesses or keyways in the bore of the sprocket or pinion. A further object is to provide a tooth unit comprising a hub, a toothed flange and an attaching flange, all integrally united, the flanges being axially spaced a distance not substantially exceeding the thickness of either flange, wherein the attaching flange of said unit is of an outside diameter exceeding the root diameter of the teeth or even exceeding the outside diameter of the toothed element. A further object is to provide a novel method of making a toothed unit comprising a tooth flange and an attaching flange of substantially the same diameter and spaced apart a distance not substantially exceeding the thickness of the attaching flange, whereby properly shaped spur teeth may be formed on the tooth flange without damage to the untoothed flange.

One embodiment of the invention is illustrated in the accompanying drawings and pointed out more particularly in the following more detailed description:

Figure 1:
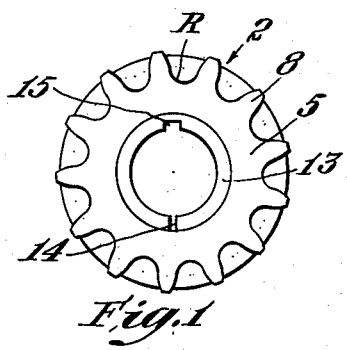
Fig. 1 is a front end elevation of a toothed element with its associated bushing in accordance with the present invention.
Figure 2:
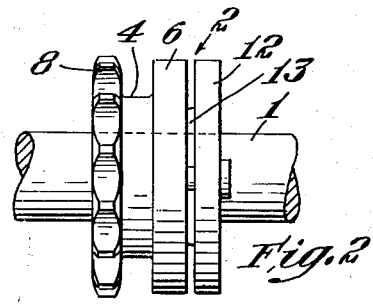
Fig. 2 is a side elevation of the parts shown in Fig. 1.

Referring to the drawings the numeral 1 designates a shaft carrying the mounting 2 of the present invention. As here illustrated the mounting comprises a tooth unit, which includes a toothed flange, here shown as constituting a sprocket, although it is to be understood that the invention is equally useful whether the toothed flange be a sprocket or pinion and when it is referred to as a "sprocket" it is to be understood that it is so designated merely for convenience in description and that the term "sprocket" is intended to be broadly inclusive of any toothed element having radial teeth, including a spur pinion or gear.

Figure 3:
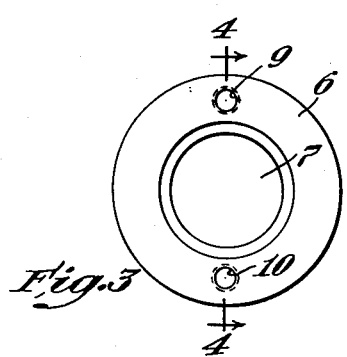
Fig. 3 is a rear end elevation of the toothed element of the present invention, the bushing being omitted.

The unit 3 (Fig. 4), which includes the sprocket, comprises the hub portion 4 having at its opposite ends the integral radial tooth flange 5 and attaching flange 6 respectively. The hub 4 is provided with an axial bore 7 which tapers in diameter, being smallest at the end at which the toothed flange 5 is located and increasing in diameter toward its opposite end. A sprocket or pinion (having a small number of teeth, that is less than about twenty) which is to be mounted on a bushing, must have a bore so large, relatively to the tip diameter of the teeth that but little metal intervenes between the roots of the teeth and the wall of the bore. For example, the maximum thickness of metal at the roots of the teeth may well be less than the root-to-tip height of a tooth. Because of the thinness of the wall of the bore, it is undesirable to form holes, recesses or slots therein, and in accordance with the present invention, the wall is preferably smooth and uninterrupted throughout. The flange 5 is shaped, as hereinafter more fully described, to provide the radial or spur teeth 8, the root portions of these teeth being indicated by the character R. The attaching flange 6 is untoothed, its peripheral surface being smoothly cylindrical. As indicated in Fig. 3, the flange 6 is provided with internally screw threaded holes 9 and 10, here shown as located on the same diameter of the flange. While two such holes are here shown it is contemplated that more holes may be provided, but it is desirable in any event that the holes be located symmetrically about the circumference of the flange. As illustrated, the diameter of the untoothed flange 6 approximates the diameter of the circle defined by the outer ends of the teeth 8. This is for the very practical purpose of providing a sufficient body of material to sustain the stresses of use. The diameter of the flange 6 is thus substantially greater than the diameter of the root circle of the teeth.

Figure 6:
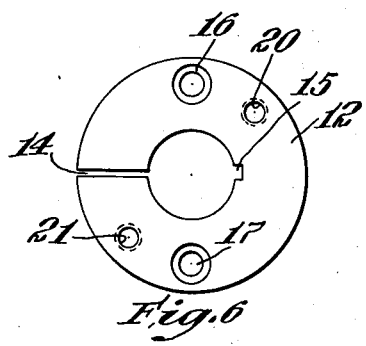
Fig. 6 is a rear end elevation of the bushing of Fig. 5.
Figure 5:
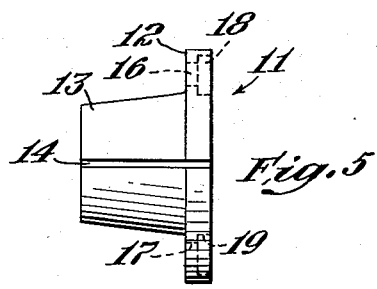
Fig. 5 is a side elevation of the bushing showing the radial split at one side of the latter.

For securing the tooth unit 3 on the shaft 1 there is provided a bushing device 11 (Fig. 5) comprising the radial flange 12 and the elongate barrel or sleeve portion 13, the latter being tapered with substantially the same taper as the bore 7 in the part 3, and the flange 12 being of substantially the same outside diameter as the flange 6 of the part 3. The bushing 11, including both its flange 12 and its barrel or sleeve portion 13, is longitudinally split, as shown at 14, and normally has a gap at the location of the split so that the bushing is capable of contracting in diameter. As shown in Fig. 6, the bushing is provided with an axially extending keyway 15 on the same diameter as the split 14 but at the opposite side of the bushing, to facilitate securing the bushing to the shaft so that it cannot rotate on the shaft.

The flange 12 of the bushing is provided, at diametrically opposite points, with unthreaded holes 16 and 17 which are preferably countersunk, as shown at 18 and 19 (Fig. 5), at the outside face of the flange. The axes of these holes 16 and 17 are aligned with the axes of the holes 9 and 10 when the bushing is assembled with the unit 4. When thus assembled, bolts 22 pass through the holes 16 and 17 into the holes 9 and 10, respectively, having screw-threaded engagement with the latter holes. By tightening these bolts the flange 12 may be drawn forcibly toward the flange 6, thus causing the tapering barrel or sleeve 13 to seat very snugly within the bore 7 of the unit 3. When the bolts are fully tightened the heads of the bolts will be seated in the countersinks 18 and 19.

Figures 9, 10:
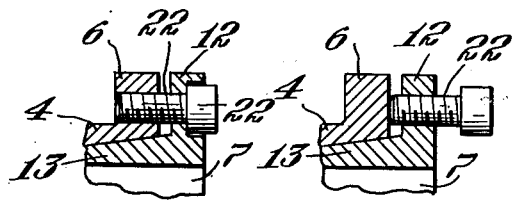
Figs. 9 and 10 are fragmentary, radial sections through the assembled toothed element and bushing illustrating respectively the way of drawing the parts toward each other and of separating them from each other.

The flange 12 is also provided with holes 20 and 21 which are internally screw threaded, but the flange 6 is not provided with any holes corresponding to or normally opposite to the holes 20 and 21. By withdrawing the bolts 22 from the holes 9 and 10 and screwing them into the holes 20 and 21, the ends of the bolts may be caused to engage the outer or right-hand face of the flange 6 and thus to force apart the flanges 12 and 6. The steps of drawing the flanges 12 and 6 together and of forcing them apart respectively are diagrammatically indicated in Figs. 9 and 10.

With this arrangement it is thus possible readily to substitute one tooth unit for another, assuming that each tooth unit thus employed will have an axial bore 7 of the same diameter and taper, and holes 9 and 10 in the same locations.

Figure 4:
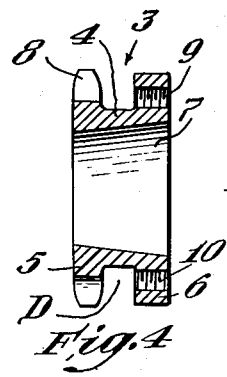
Fig. 4 is a section substantially on the line 4—4 of Fig. 3.
Figure 7:
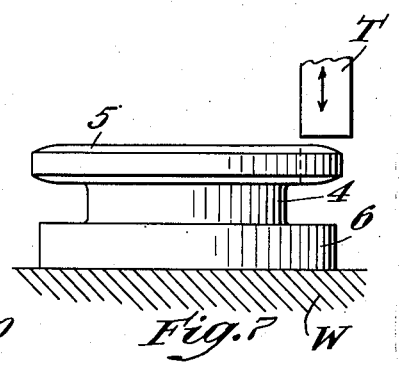
Fig. 7 is a diagram illustrating a method of making the teeth of the sprocket or pinion.
Figure 8:
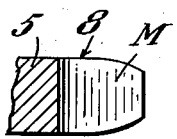
Fig. 8 is a fragmentary edge elevation of one of the teeth of the sprocket or pinion illustrating the tool marks resultant from the method of making the sprocket or pinion.

As may be noted by reference to Fig. 4, the flanges 5 and 6 of the unit 3 are spaced apart a distance D, which does not substantially exceed the thickness of either flange. Devices of this type are commonly used in places where it is necessary to be as economical of space as possible or where it is impossible to use a hub of more than a very definitely limited axial length. When the toothed flange is a sprocket, the space D will usually not exceed that necessary to provide clearance for the links of the sprocket chain engaging the teeth of the sprocket. Thus it is evident that the opposed faces of the flanges 5 and 6 will be close together, ordinarily not further apart than the depth of one of the teeth of the toothed element. Since the clearance space D is thus small, it is not possible to form standard teeth on the flange 5 by methods most commonly used in shaping spur gear teeth since the usual rotary cutters employed for that purpose would cut into the flange 6. In accordance with the present invention, as diagrammatically illustrated in Fig. 7, the teeth 8 are formed in the part 5, for example by mounting the flange 6 on a rigid support W, for instance the table of a suitable machine tool having a cutter T which reciprocates vertically. By the use of a tool of appropriate contour the teeth 8 are thus formed, the stroke of the cutter being such that it does not contact the upper surface of the flange 6. The teeth thus formed may be identified by the fact that they show tool marks, in the nature of fine parallel scratches, extending axially of the toothed element, for example as indicated at M (Fig. 8).

By this procedure in forming the teeth it becomes possible to make a unit comprising the parts 5 and 6 in which the hub 4, with which the toothed element 5 is integral, is provided with a radial flange 6 of a diameter equalling or exceeding the root diameter of the toothed element, and available for association with a radial flange on a tapered bushing whereby the hub of the tooth unit may be removably mounted on a shaft in such a way that it is firmly secured to the shaft in a very simple and effective way and as easily removed from the shaft when it is desired to do so.

While one desirable embodiment of the invention has herein been illustrated by way of example, it is to be understood that the invention is broadly inclusive of any and all modifications falling within the scope of the appended claims.

I claim:

1. In combination with a tapered, split bushing designed to be fixed to a shaft, a unit comprising two coaxial, radial flanges spaced apart and integrally joined to the opposite ends of a hub, said flanges being spaced apart a distance not substantially exceeding the axial thickness of either flange, one of said flanges being toothed to constitute a sprocket or pinion, the unit having a tapered axial bore whose smaller end is adjacent to the toothed flange and whose diameter, at its smaller end, is such that the thickness of the metal intervening between the roots of the teeth and the wall of the bore does not substantially exceed the root-to-tip height of a tooth, the bushing fitting within the axial bore of said unit and having an integral radial flange which is opposed to the outer face of the untoothed flange of said unit, and means, comprising a plurality of independent bolts, for moving said latter flanges toward or from each other.

2. In combination with a tapered split bushing designed to be fixed to a shaft, a unit comprising a toothed element having a tapered axial bore which, at its smaller end, exceeds one-half the root diameter of the teeth of the toothed element, an untoothed radial flange and a hub, each integral with the toothed element, the flange being spaced axially from the toothed element a distance not substantially exceeding the axial thickness of the toothed element, said axial bore extending through the toothed element, the hub and the flange, the bushing fitting within the axial bore of said unit and having an integral, radial flange which is opposed to the outer face of the flange of said unit, and means for moving said flanges toward or from each other.

3. In combination, a hub having integral flanges at its opposite ends, one of the flanges having radial teeth and the other being untoothed, the outside diameter of the latter flange exceeding the root diameter of the teeth of the first flange, the flanges being spaced apart axially a distance not substantially exceeding the depth of the teeth, the hub having a tapered axial bore whose wall is smooth and circumferentially uninterrupted, the diameter of the bore being such that the metal intervening between the wall of the bore and the roots of the teeth does not substantially exceed in thickness the root-to-tip height of a tooth, a tapered bushing fitting within the bore in the hub, the bushing having a flange adjacent to the untoothed flange of the hub, and means operative to move the latter flanges toward or from each other.

4. In combination, a hub having a tapered axial bore having a smooth wall circumferentially uninterrupted and an integral radial flange at each end, one of said radial flanges being toothed to constitute a sprocket and the other flange being untoothed, the flanges being axially spaced apart a distance not substantially exceeding that necessary to provide clearance for a sprocket chain engaging the teeth of the sprocket, the root diameter of the teeth of the sprocket being less than the outer diameter of the untoothed flange and the axial bore in the sprocket being of such diameter that the metal intervening between the wall of the bore and the roots of the teeth does not substantially exceed in thickness the root-to-tip height of a tooth, a tapered bushing fitting within the axial bore of the hub, said bushing being split in a diametrical plane at one side and at its opposite side, in the same plane, having an axially extending keyway, a flange on the bushing externally to the hub and confronting the untoothed flange of the latter, and means for moving the latter flanges toward and from each other.

5. In combination, a hub having a tapered axial bore whose wall is smooth and circumferentially uninterrupted and an integral, radial flange at each end, one of said radial flanges being toothed to constitute a sprocket and the other flange being untoothed, the diameter of the axial bore exceeding one-half the root diameter of the teeth of the sprocket, the flanges being axially spaced to provide clearance for a sprocket chain engaging the teeth of the sprocket, the root diameter of the teeth of the sprocket being less than the outer diameter of the untoothed flange, a tapered bushing fitting within the axial bore of the hub, said bushing being split in a diametrical plane at one side and, at its opposite side in the same plane, having an axially extending keyway, a flange on the bushing externally to the hub and confronting the untoothed flange of the latter, the flange of the bushing having therein a plurality of symmetrically arranged, axially extending unthreaded holes and the untoothed flange of the hub having correspondingly arranged threaded holes, bolts normally passing through the holes in the bushing flange and having threaded engagement with the holes in the untoothed hub flange for drawing the bushing flange toward the untoothed flange of the hub, the bushing flange having other symmetrically arranged threaded holes for alternative engagement by the aforesaid bolts whereby the bushing flange may be forced away from the unthreaded flange of the hub.

6. In combination, a hub having a tapered axial bore whose wall throughout its entire length is smooth and circumferentially uninterrupted, the hub having an integral radial flange at each end, that one of said radial flanges which is adjacent to the smaller end of the bore being toothed, the diameter of the bore at its smaller end being such that the metal intervening between the wall of the bore and the roots of the teeth does not substantially exceed the root-to-tip height of a tooth, the flanges being spaced apart axially a distance not substantially exceeding the depth of said teeth, the toothed flange not exceeding the other flange in radius by more than the depth of a tooth, a tapered bushing fitting within the axial bore of the hub, said bushing being split in a radial plane at one side, the bushing flange having two sets of axially extending holes, the holes of one set being unthreaded and those of the other set being threaded, the untoothed flange of the hub having threaded holes arranged to receive bolts passing through the unthreaded holes of the bushing flange whereby the bushing flange and untoothed flange of the hub may be drawn toward each other, the bolts being alternatively engageable with the threaded holes in the bushing flange whereby, by advancing the bolts into contact with the outer face of the untoothed flange of the hub, the bushing flange may be forced away from said latter hub flange.

7. In combination, a hub having a tapered axial bore and integral radial flanges at its opposite ends, one of the flanges having spur teeth, the other radial flange being untoothed, said flanges being spaced apart a distance not substantially exceeding the depth of the teeth, the external diameter of the untoothed flange exceeding the root diameter of the teeth of the toothed flange, the axial bore, at its smaller end, at least, being of a diameter such that the metal intervening between the wall of the bore and the roots of the teeth does not substantially exceed in radial thickness the root-to-tip height of a tooth, a tapered bushing fitting within the bore in the hub, the bushing being split at one side in a radial plane and having a radial flange adjacent to the untoothed flange of the hub, and means operative to move the bushing flange toward or from the untoothed flange of the hub.

MARTIN T. SCHUMB.

References Cited in the file of this patent

UNITED STATES PATENTS

| Number | Name | Date |
|---|---|---|
| 1,422,598 | Misenheimer | July 11, 1922 |